Patented May 15, 1951

2,553,206

UNITED STATES PATENT OFFICE 2,553,206

POLYSULFIDE POLYMER

Joseph C. Patrick, Morrisville, Pa., assignor to Thiokol Corporation, a corporation of Delaware No Drawing. Application October 4, 1945, Serial No. 620,402

5 Claims. (Cl. 260—79.1)

This invention relates to polysulfide polymers.

One of the objects of the invention is to provide a polymer which is characterized by what may be termed "chemical plasticization," i. e., a polymer, the plasticity of which is obtained and controlled not by the physical admixture of a plasticizer but by providing atomic structure which is an integral part of the molecules of the polymer and which controls the plastic qualities within desired limits.

Another object is to provide a new process, the principle of which may be applied to produce a polysulfide polymeric product substantially odorless and tasteless. Such a polymer has a number of important uses in applications where freedom from odor and/or taste is necessary, e. g., as a sealing, coating or lining for food containers.

Another object is to provide a polymer which may be successfully used instead of or in conjunction with natural chicle in the manufacture of chewing gum or chewing gum bases.

In accordance with the principles of the invention, a combination of conditions is observed in order to realize the maximum advantages of the invention as follows:

(1) An organic dihalogen compound is employed having linear chains of at least six atoms between the halogen atoms. The atoms of said chain are selected from the group consisting of carbon, oxygen and sulfur atoms and at least five of the atoms of said chain are carbon atoms.

(2) The said halogen compound is reacted with an alkaline or ionizable sulfide reagent which may be symbolized by the expression $MS_{1.1 \text{ to } 1.9}$ where S is a sulfur atom and M is an inorganic or organic cation illustrated by alkali metals, alkaline earth metals, ammonium, alkyl ammonium, alkanol radicals, etc.

The use of this reagent introduces monosulfide as well as disulfide linkages into the chains of the polymer, creates the internal or structural plasticization above-mentioned and makes it possible to carry out step (3) described below without rendering the polymer too tough or intractable for many purposes. The structural or "chemical" plasticization mentioned has a great advantage over the use of physically admixed plasticizers because the latter have a certain amount of vapor pressure tending to impart odor and/or taste and in numerous instances even introduce toxicity into the product.

(3) The treatment with the sulfide reagent is carried out so as to convert into high polymers any low polymers in the product produced as in step (2) or to solubilize said low polymers whereby they are readily removed. This treatment involves subjecting the polymer obtained as above described in step (2) to treatment with an alkaline sulfide. The proportion of sulfur in the alkaline sulfide used in this treatment should be not less than that indicated by the formula $MS_{1.1 \text{ to } 1.9}$. If a sulfide of this character is used in this step (3), steps (2) and (3) can be combined. Preferably, however, the sulfide used in step (3) is a disulfide or other polysulfide in which the sulfur rank is about 2 or between about 2 and 6, and in this case, step (3) is separate and distinct from step (2). In said step (3) it is also possible to use an alkaline monosulfide.

The organic halogen compounds generically defined above are illustrated by the following table of examples:

Table I $ClCH_2CH_2OCH_2CH_2CH_2Cl$

Dichlor propyl ethyl ether $ClC_2H_4OCH_2OC_2H_4Cl$

Dichlor diethyl formal $ClC_2H_4OC_2H_4OC_2H_4Cl$

Triglycol dichloride $$ClC_2H_4OCH_2OCH_2\overset{CH_3}{\underset{|}{C}H}OCH_2OC_2H_4Cl$$

Dichlor diethyl formal of propylene glycol $ClC_2H_4OCH_2OC_2H_4OCH_2OC_2H_4Cl$

Dichlor diethyl formal of ethylene glycol $Cl(CH_2)_6Cl$

Hexamethylene dichloride $Cl(CH_2)_7Cl$

Heptamethylene dichloride $ClC_2H_4SCH_2SC_2H_4Cl$

Dichlor diethyl mercaptal $$ClC_2H_4O\overset{CH_3}{\underset{|}{C}}OC_2H_4Cl$$

Dichlor diethyl acetal $$ClC_2H_4O\overset{C_2H_5}{\underset{|}{C}}OC_2H_4Cl$$

Dichlor diethyl propal

Cl⟨⟩CH₂CH₂Cl

HCl⟨H₂ H₂ / H₂ H₂⟩HCl

It will be noted that in a number of the above formulae the carbon atoms to which the halogen atoms are attached are in the beta position to an oxygen or sulfur atoms.

To illustrate the principle of the invention, let it be assumed that BB' dichlor diethyl formal is selected as the functional organic product from which the polymer is to be made. A polymer may be made from this compound by known methods, i. e., by reaction with polysulfides having the general formula $MS_{2\ to\ 6}$ where M is the cation of the polysulfide. For many purposes the odor of the resulting product is entirely satisfactory For other purposes, however, the above-mentioned polymer would fail to meet certain exacting criteria of odor and taste. One of such criteria involves heating the polymer to an elevated temperature such as 300° F. for a certain period and noting whether any odor develops. A test of this character is used for example where the polymer is to be used as a component of chewing gum.

It has been found that in the polysulfide reaction above-mentioned the polymeric product contains a large number of polymers of different (B)

$$- - - S\ S\ \overset{H_2}{\underset{}{C}}\ \overset{H_2}{\underset{}{C}}\ O\ CH_2\ O\ \overset{H_2}{\underset{}{C}}\ \overset{H_2}{\underset{}{C}}\ S\ \overset{H_2}{\underset{}{C}}\ \overset{H_2}{\underset{}{C}}\ O\ CH_2\ O\ \overset{H_2}{\underset{}{C}}\ \overset{H_2}{\underset{}{C}}\ S\ - - -$$

molecular weights varying over a wide range. It has also been found that the source of the slight odor and/or taste which is responsible for failure of the product to meet certain exacting criteria resides in relatively low molecular weight polymers produced by the reaction. It has also been found that these low molecular weight products may be converted into high molecular weight bodies or removed. However, while this treatment greatly improves the odor and taste response, it may produce a polymer too tough or intractable for many purposes, e. g., as a constituent of chewing gum.

In accordance with the present invention, not only is the problem of odor and taste solved but also the consistency or plasticity is controlled within desired limits. In accomplishing these results a new principle has been evolved whereby the polymer is chemically plasticized and may be submitted to a rather drastic polymerizing treatment (to convert low molecular to high molecular weight products or to convert said low molecular weight products into soluble readily removable products) while still maintaining the workability or plasticity of the product within desired limits. This new principle will be explained as follows.

Again referring to BB' dichlor diethyl formal (it being understood that this substance is merely one species of a class or genus as herein defined) the polymer obtained by reaction with sodium disulfide, trisulfide, tetrasulfide, etc., has the structure (A)

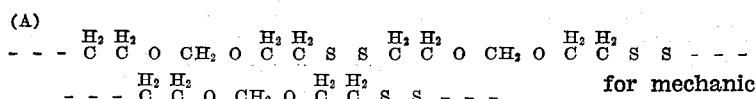

This formula shows a segment of a long chain. By reaction of the dichlor formal with, for example, sodium disulfide or tetrasulfide in molar excess, e. g., a ratio of about 1.2 to 2.0 or more mols of polysulfide to 1 mol of organic substance a polymeric product having an average very high molecular weight, e. g., 100,000 to 200,000 is obtained. Nevertheless, not all of the polymers in the product have the same molecular weight. The molecular weight of some of the polymers will be much lower; and it is those lower molecular weight polymers which are responsible, at least to a large extent, for the failure of the above-mentioned polymer to meet the more exacting criteria of odor and taste.

By using a sufficiently large excess of polysulfide in the initial reaction or as an after treatment, the lower molecular weight products can be converted into high molecular weight products but it has been found that then the product is too tough or intractable for many purposes.

Now it has been found that by using a sulfide reagent in which monosulfide is present, i. e., a reagent which may be expressed in terms of composition by the symbol $MS_{1.1\ to\ 1.9}$ where S is sulfur and M is the cation of the sulfide reagent, that is, a reagent wherein the sulfide content is between 1.1 and 1.9 times as great as the sulfide content of the corresponding monosulfide (said cation may be an alkali metal, alkaline earth metal, ammonium, etc.), monosulfide linkages are introduced into the chains of the polymer. Such modified chain segments may be represented as

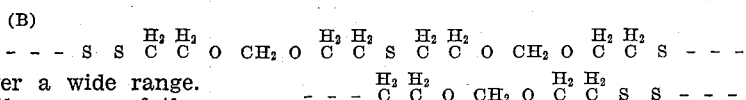
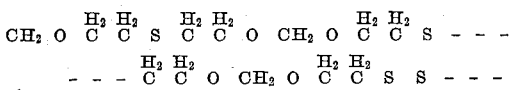

The reagent contains both monosulfide and disulfide groups and the polymer contains both monosulfide and disulfide linkages.

It will be noted that the disulfide linkages of polymer (B) are separated to a greater extent than in polymer (A) and it has been found that when a polymer of this character is subjected to treatment to convert the relatively short chains to long chains that this may be accomplished without making the resulting product too intractable for a number of uses. The resulting polymer is a copolymer, i. e., part is a monosulfide polymer and part a disulfide polymer, these parts being grouped at random and chemically combined. The average spacing of the —SS— linkages depends on the ratio of disulfide to monosulfide in the reagent used. This reagent is readily made by mixing a monosulfide, e. g., the monosulfide of sodium with a disulfide of sodium to obtain any desired proportion within a range of compositions expressed by the formula $MS_{1.1\ to\ 1.9}$.

Purely by way of illustrating the principles which have been described and will be set forth in the claims, the following examples are given.

*Example 1.*—Use of an alkaline sulfide having a composition indicated approximately by the formula $MS_{1.1\ to\ 1.9}$ in the initial reaction followed by an after treatment involving the use of a sulfide having a composition within the range indicated by the formula $MS_{2\ to\ 6}$.

Into a flask fitted with condenser and means for mechanical agitation and of not less than 3 liters capacity are introduced 2000 cc. of a 2-molar solution having a composition indicated by the empirical formula $Na_2S_{1.5}$. To the sulfide solution are added about one gram of a suitable wetting agent which may be, for example, a sodium naphthalene sulfonate and 6 grams of freshly precipitated magnesium hydroxide. This mixture is heated with agitation to a temperature of about 60° C. and 3 mols of dichloro diethyl formal are added to the heated polysulfide mix at such a rate that about 30 minutes are required for the complete introduction of the organic halide. Since this reaction is somewhat exothermic the temperature is controlled by any suitable means in such a way that it does not go above a temperature of about 90° C. during the introduction of the organic halide.

After all of the organic halide has been added to the polysulfide mix the temperature is raised to 100–105° C. for about 30 minutes. Water is added to dilute the dispersion to the capacity of the reaction vessel, the agitator is stopped and the latex-like polymer dispersion is allowed to settle out. The supernatant liquid is withdrawn by any suitable means such as decantation and the latex is washed once with water and allowed to settle again thereby removing most of the soluble by-products of the reaction. The supernatant liquid is again withdrawn and 2000 cc. of a molar solution of $Na_2S_2$ are added to the concentrated latex dispersion. The reaction vessel is heated again with agitation to a temperature of about 90° C. for about 30 minutes, after which the latex is washed free from water soluble materials.

The washed latex-like dispersion procured as described above may be used in the dispersed form or if so desired it can be coagulated to a soft rubber-like mass by acidification with any suitable acid, for example, acetic acid, or dilute hydrochloric acid, until the pH of the mixture after acidification is about 4. This treatment causes the coagulation of the dispersed polymer. The polymer so obtained is substantially odorless and tasteless and will withstand exacting tests in this respect. For example, it may be heated to a temperature of about 300° F. without developing any disagreeable odor. It will be understood, of course, that in the initial reaction expressed above instead of an alkaline sulfide having the formula $MS_{1.5}$, any alkaline or ionizable sulfide having a composition expressed approximately by the formula $MS_{1.1 \text{ to } 1.9}$ may be used in the initial reaction and that in the after treatment instead of using an alkaline disulfide, any alkaline, ionizable or water soluble polysulfide having a composition expressed approximately by the formula $MS_{2 \text{ to } 6}$ may be employed.

*Example 2.*—Modified procedure in which instead of using an after treatment a single treatment with an alkaline or ionizable sulfide is employed, the proportion thereof being in considerable excess and the composition thereof being expressed approximately by the formula $MS_{1.1 \text{ to } 1.9}$.

Proceed as in Example 1 except that 4000 cc. of a 2-molar solution of a sulfide having the empirical formula $Na_2S_{1.4}$ is substituted for the 2000 cc. of $Na_2S_{1.5}$ described in Example 1. After all the dihalide is added to the flask, the temperature in this case is raised to 100–105° C. for 60 minutes instead of 30 minutes after which the polymer dispersion is treated exactly as described in Example 1.

*Example 3.*—Proceed as in Example 2 using a portion of the sulfide reagent say about half in the initial reaction and the remainder as an after treatment.

*Example 4.*—Use of an alkaline monosulfide for the after treatment.

Proceed as in Example 1 except that in the after treatment 1000 cc. of a 2-molar solution of sodium monosulfide are used instead of the 1000 cc. of 2-molar disulfide shown in Example 1, and the heat treatment after the addition of the monosulfide is changed to 60 minutes instead of the 90 minutes shown in Example 1, after which the poylmer dispersion is treated exactly as in Example 1.

What is claimed is:

1. Process of making a substantially odorless and tasteless plastic sulfide polymer which comprises heating an alkaline sulfide with an organic compound having a halogen atom attached to each of two carbon atoms, said halogen atoms being separated by a chain containing at least six atoms selected from the group consisting of carbon atoms, oxygen atoms and sulfur atoms at least five of the atoms in said chain being carbon atoms, the proportion of sulfur in said alkaline sulfide being indicated approximately by the formula $MS_{1.1 \text{ to } 1.9}$ where S is a sulfur atom and M is the cation of said sulfide, i. e. the sulfur content of said alkaline sulfide being between 1.1 and 1.9 times as great as that of the corresponding monosulfide, obtaining a polymeric product by said reaction separating said product from soluble by-products, and subjecting said polymeric product to a supplemental treatment to convert low polymers therein to high polymers by heating said polymeric product with an alkaline sulfide the proportion of sulfur in the alkaline sulfide used in said supplemental treatment being not less than that indicated by the above-mentioned formula $MS_{1.1 \text{ to } 1.9}$.

2. Process of making a substantially odorless and tasteless plastic sulfide polymer which comprises heating an alkaline sulfide with an organic compound having a halogen atom attached to each of two aliphatic carbon atoms, said halogen atoms being separated by a chain containing at least six atoms selected from the group consisting of carbon atoms, oxygen atoms and sulfur atoms at least five of the atoms in said chain being carbon atoms, the proportion of sulfur in said alkaline sulfide being indicated approximately by the formula $MS_{1.1 \text{ to } 1.9}$ where S is a sulfur atom and M is the cation of said sulfide, i. e. the sulfur content of said alkaline sulfide being between 1.1 and 1.9 times as great as the sulfur content of the corresponding monosulfide, obtaining a polymeric product by said reaction separating said product from soluble by-products, and subjectinqg said polymeric product to a supplemental treatment to convert low polymers therein to high polymers by heating said polymeric product with an alkaline sulfide, the proportion of sulfur in the alkaline sulfide used in said supplemental treatment being not less than that indicated by the above-mentioned formula $MS_{1.1 \text{ to } 1.9}$.

3. Process of making a substantially odorless and tasteless plastic sulfide polymer which comprises heating an alkaline sulfide with an organic compound having a halogen atom attached to each of two methylene carbon atoms, each of said carbon atoms being in the beta position to an atom selected from the group consisting of oxygen and sulfur, said halogen atoms being separated by a chain containing at least six atoms selected from the group consisting of carbon atoms, oxygen atoms and sulfur atoms at least five of the atoms in said chain being carbon atoms, the proportion of sulfur in said alkaline sulfide being indicated approximately by the formula $MS_{1.1 \text{ to } 1.9}$ where S is a sulfur atom and M is the cation of said sulfide, i. e. the sulfur content of said alkaline sulfide being between 1.1 and 1.9 times as great as the sulfur content of the corresponding monosulfide, obtaining a polymeric product by said reaction separating said product from soluble by-products, and subjecting said polymeric product to a supplemental treatment to convert low polymers therein to high polymers by heating said polymeric product with an alkaline sulfide, the proportion of sulfur in the alkaline sulfide used in said supplemental treatment being not less than that indicated by the above-mentioned formula $MS_{1.1 \text{ to } 1.9}$.

4. Process of making a substantially odorless and tasteless plastic sulfide polymer which comprises heating an alkaline sulfide with an organic compound having a halogen atom attached to each of two carbon atoms, said halogen atoms being separated by a chain containing at least six atoms selected from the group consisting of carbon atoms, oxygen atoms and sulfur atoms at least five of the atoms in said chain being carbon atoms, the proportion of sulfur in said alkaline sulfide being indicated approximately by the formula $MS_{1.1 \text{ to } 1.9}$ where S is a sulfur atom and M is the cation of said sulfide, i. e. the sulfur content of said alkaline sulfide being between 1.1 and 1.9 times as great as the sulfur content of the corresponding monosulfide, obtaining a polymeric product by said reaction separating said product from soluble by-products, and subjecting said polymeric product to a supplemental treatment to convert low polymers therein to high polymers by heating said polymeric product with an alkaline monosulfide.

5. Process of making a substantially odorless and tasteless plastic sulfide polymer which comprises heating an alkaline sulfide with an organic compound having a halogen atom attached to each of two carbon atoms, said halogen atoms being separated by a chain containing at least six atoms selected from the group consisting of carbon atoms, oxygen atoms and sulfur atoms at least five of the atoms in said chain being carbon atoms, the proportion of sulfur in said alkaline sulfide being indicated approximately by the formula $MS_{1.1 \text{ to } 1.9}$ where S is a sulfur atom and M is the cation of said sulfide, i. e. the sulfur content of said alkaline sulfide being between 1.1 and 1.9 times as great as the sulfur content of the corresponding monosulfide, obtaining a polymeric product by said reaction, and subjecting said polymeric product to a supplemental treatment to convert low polymers therein to high polymers by heating said polymeric product with an alkaline sulfide, the proportion of sulfur in the alkaline sulfide used in said supplemental treatment being that indicated by the formua $MS_{2 \text{ to } 6}$.

JOSEPH C. PATRICK.

REFERENCES CITED

The following references are of record in the file of this patent:

UNITED STATES PATENTS

| Number | Name | Date |
|---|---|---|
| 1,990,202 | Patrick | Feb. 5, 1935 |
| 2,050,583 | Orthner | Aug. 11, 1936 |
| 2,142,144 | Patrick | Jan. 3, 1939 |
| 2,166,507 | Schroter | July 18, 1939 |
| 2,216,044 | Patrick | Sept. 24, 1940 |
| 2,392,402 | Patrick | Jan. 8, 1946 |
| 2,402,977 | Patrick et al. | July 2, 1946 |